United States Patent
Sheu et al.

(10) Patent No.: US 6,668,561 B1
(45) Date of Patent: Dec. 30, 2003

(54) PRESSURE REGULATED STRUCTURE

(75) Inventors: Chi H. Sheu, Los Angeles, CA (US);
Carl A. Reis, Torrance, CA (US);
George V. Case, Gardena, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/185,939

(22) Filed: Jun. 27, 2002

(51) Int. Cl.$^7$ .............................. F17C 1/00; F17C 13/00; F17C 3/00
(52) U.S. Cl. ................................... 62/45.1; 220/560.12
(58) Field of Search ................ 62/45.1; 220/560.12

(56) References Cited

U.S. PATENT DOCUMENTS

| | | | | |
|---|---|---|---|---|
| 2,609,068 A | * | 9/1952 | Pajak ........................... 428/118 |
| 2,962,811 A | * | 12/1960 | Herbert ........................ 228/181 |
| 3,150,793 A | * | 9/1964 | Messer ........................ 52/309.9 |
| 3,365,897 A | * | 1/1968 | Middleton et al. ............. 62/45.1 |
| 3,383,004 A | * | 5/1968 | Closner .................. 220/560.12 |
| 3,766,876 A | * | 10/1973 | Cowles ..................... 114/74 A |
| 4,011,963 A | * | 3/1977 | Cheng et al. .......... 220/560.12 |
| 4,023,617 A | * | 5/1977 | Carlson et al. ............. 165/169 |
| 4,265,955 A | | 5/1981 | Harp et al. ................. 428/116 |
| 4,816,097 A | * | 3/1989 | Williams et al. ............ 156/247 |
| 5,653,836 A | | 8/1997 | Mnich et al. ................. 156/98 |
| 6,003,283 A | | 12/1999 | Hull ........................ 52/783.18 |
| 6,114,652 A | | 9/2000 | Clarke et al. .......... 219/121.71 |
| 6,135,238 A | | 10/2000 | Arcas et al. ................. 181/292 |
| 6,178,754 B1 | * | 1/2001 | Dujarric ..................... 62/45.1 |

FOREIGN PATENT DOCUMENTS

EP     0 336 260 B1    11/1993       B23K/26/18

* cited by examiner

*Primary Examiner*—William C. Doerrler
(74) *Attorney, Agent, or Firm*—Baker Botts, L.L.P.

(57) ABSTRACT

A pressure regulated structure includes a first layer, a second layer, a non-metallic honeycomb assembly, and a vent. The honeycomb assembly is between the first layer and the second layer and includes a plurality of walls forming cells, at least some of the walls including laser-formed apertures to allow fluid communication between cells. The vent is fluidly coupled to the honeycomb assembly, wherein fluid in the cells of the honeycomb assembly may be removed through the vent to decrease pressure in the structure.

24 Claims, 2 Drawing Sheets

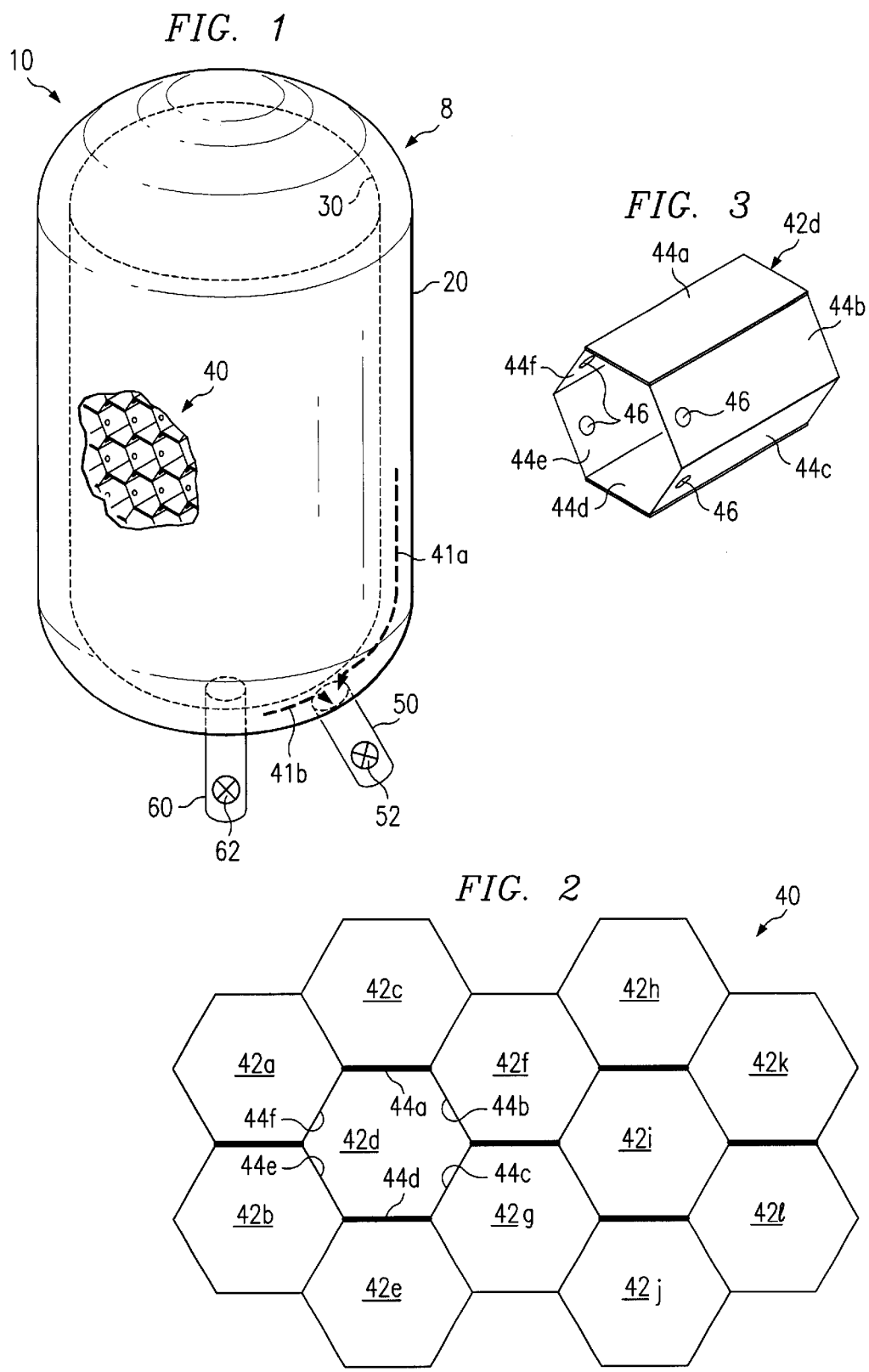

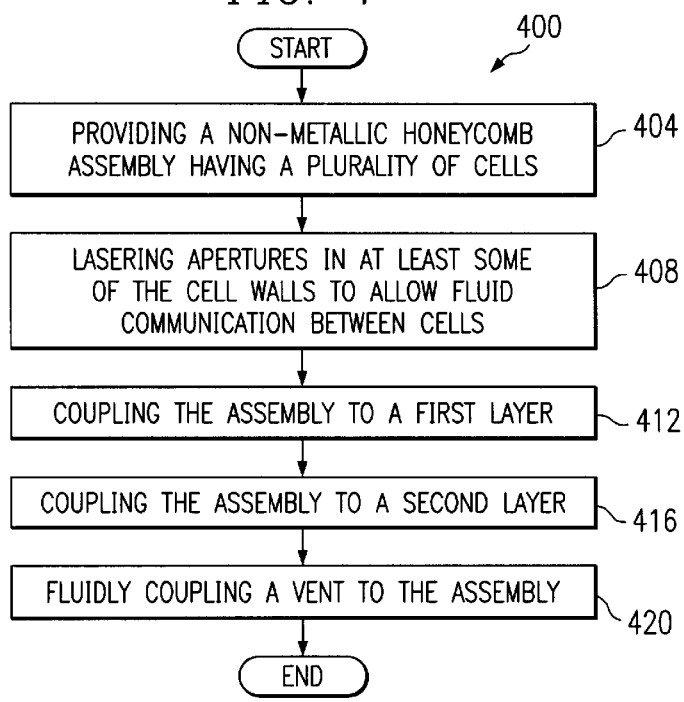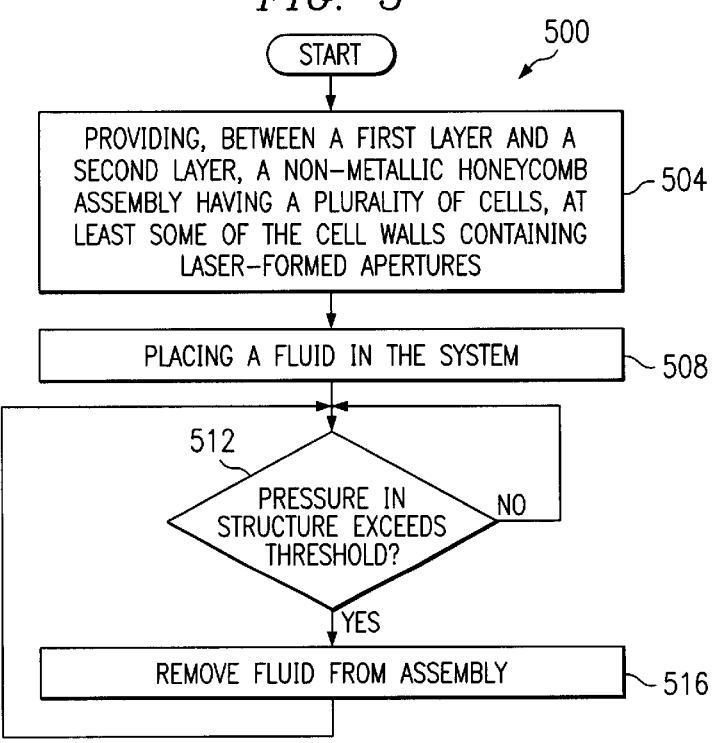

PRESSURE REGULATED STRUCTURE

TECHNICAL FIELD OF THE INVENTION

This invention relates to structures, and more particularly, to a pressure regulated structure.

BACKGROUND OF THE INVENTION

Tanks containing cryogenic liquids for space applications often have a skin composed of a composite material because of its superior combination of weight and strength characteristics versus metal. Unfortunately, cryogenic liquids, such as, for example, liquid hydrogen, liquid oxygen, and liquid helium, have a tendency to penetrate composite materials and convert, possibly when heated, to a gaseous form. Thus, if such a tank is heated, the gas in the skin readily expands, possibly causing the tank's skin to destruct.

SUMMARY OF THE INVENTION

The present invention substantially reduces and/or eliminates at least some of the problems and disadvantages associated with previously developed fluid containment systems. Accordingly, the present invention provides, at least in particular embodiments, a pressure regulated structure that is useful in fluid containment systems.

In certain embodiments, a pressure regulated structure includes a first layer, a second layer, a non-metallic honeycomb assembly, and a vent. The non-metallic honeycomb assembly is between the first layer and the second layer and includes a plurality of walls forming cells, at least some of the walls including laser-formed apertures to allow fluid communication between cells. The vent is fluidly coupled to the honeycomb assembly, wherein fluid in the cells of the honeycomb assembly may be removed through the vent to decrease pressure in the structure.

In particular embodiments, a method for manufacturing a pressure regulated structure includes lasering apertures in at least some of the cell walls of a non-metallic honeycomb assembly to allow fluid communication between cells. The method also includes coupling the assembly to a first layer and coupling the assembly to a second layer, wherein fluid in the cells of the honeycomb assembly may flow between cells to be removed from the structure.

The present invention possesses several technical features. For example, by including apertures in the honeycomb assembly, fluid that penetrates the structure may be removed. Thus, the structure, and a system of which it may be a part, may be protected from pressure build-up due to internal and/or external fluid penetration. As another example, by forming the honeycomb assembly of a non-metallic material, the structure, and a system of which it may be a part, may have enhanced insulative characteristics. As a further example, by using a laser to form the apertures in the cell walls of the honeycomb assembly, the aperture sizes and locations may be tightly controlled, and, if needed, the sizes of the apertures may be made relatively small. Thus, the impact of the apertures on the integrity of the honeycomb assembly may be predicted with reasonable accuracy and may be made relatively small. Moreover, the apertures may be formed using minimal physical contact with the honeycomb assembly, which helps to reduce damage thereto. As an additional example, in embodiments where the apertures are formed primarily or exclusively in the non-ribbon walls of the cells, better structural performance may result for the honeycomb assembly.

Particular embodiments, of course, may possess none, one, some, or all of these technical features and/or additional technical features. Other technical features will be readily apparent to those skilled in the art from the following figures, detailed description, and/or claims.

BRIEF DESCRIPTION OF THE DRAWINGS

The drawings described below provide a more complete understanding of the present invention, especially when considered in conjunction with the following detailed description, and also of its technical features:

FIG. 1 illustrates a pressure regulated structure in accordance with one embodiment of the present invention;

FIG. 2 illustrates one embodiment of a honeycomb assembly for the pressure regulated structure in FIG. 1;

FIG. 3 illustrates one embodiment of a cell for the honeycomb assembly in FIG. 2;

FIG. 4 is a flowchart illustrating a method for manufacturing a pressure regulated structure in accordance with one embodiment of the present invention; and FIG. 5 is a flowchart illustrating a method for using a pressure regulated structure in accordance with one embodiment of the present invention.

DETAILED DESCRIPTION OF THE INVENTION

FIG. 1 illustrates a pressure regulated structure 10 in accordance with one embodiment of the present invention. As illustrated, structure 10 is part of a fluid containment system 8. In general, system 10 includes a first layer 20, a second layer 30, a honeycomb assembly 40 located between first layer 20 and second layer 30, and a vent 50 fluidly coupled to honeycomb assembly 40. System 8 also includes an outlet 60 fluidly coupled to its interior.

In operation, system 8 is designed to contain a fluid—liquid and/or gas—for an extended period of time. Because the fluid may penetrate second layer 30 of structure 10 and enter honeycomb assembly 40, the cells of honeycomb assembly 40 contain a series of laser-formed apertures (discussed in more detail below) to allow fluid communication, illustrated by arrows 41, to vent 50, where the fluid may be removed from honeycomb assembly 40. The removal of fluid from honeycomb assembly 40 allows the pressure in structure 10 to be regulated.

In more detail, first layer 20 and second layer 30 may be composed of any of a variety of materials and may have any of a variety of configurations. For example, first layer 20 and/or second layer 30 may be composed of composite, metal, plastic, and/or any other appropriate type of material for containing a fluid. As another example, first layer 20 and/or second layer 30 may be spherical, cylindrical, elliptical, and/or any other appropriate shape for containing a fluid. First layer 20 and second layer 30 may have any appropriate thickness. In the illustrated embodiment, first layer 20 and second layer 30 are the outer skin and inner skin, respectively, for fluid containment system 8.

Honeycomb assembly 40 may also be composed of any of a variety of materials and have any of a variety of configurations. For example, honeycomb assembly 40 may be composed of aramid webs, fiberglass webs, graphite webs, and/or any other appropriate type of non-metallic web that has been treated with a resin, such as, for example, a phenolic or a polyimide, to stabilize the assembly. In particular embodiments, honeycomb assembly 40 composes a high modulus aramid web treated with a phenolic resin. As another example, the cells of honeycomb assembly 40 may be triangular, rectangular, hexagonal, octagonal, elliptical, circular, and/or any other appropriate type of shape. Additionally, the cells of honeycomb assembly 40 may or may not include a septum. Honeycomb assembly 40 may be adhered, bonded, molded, and/or otherwise coupled to first layer 20 and second layer 30.

As mentioned previously, the cells of honeycomb assembly 40 include laser-formed apertures (not shown) that allow fluid communication between cells. In general, the cell walls of honeycomb assembly 40 may have any number of apertures to allow the fluid communication. Additionally, the apertures may be circular, elliptical, rectangular, and/or any other appropriate shape for allowing fluid communication and are formed using a laser. In particular embodiments, the apertures may be between approximately 0.040 inches and 0.020 inches in diameter. In other embodiments, however, the apertures may be between 0.100 inches and 0.001 inches in diameter. In general, any size of aperture that satisfies the design requirements for the system may be used in the cell walls.

Vent 50, as mentioned previously, is fluidly coupled to honeycomb assembly 40 to allow fluid to be removed from structure 10. Vent 50 may have any of a variety of configurations. For example, vent 50 may include an aperture, a pipe, a conduit, and/or any other type of mechanism for allowing fluid to flow from honeycomb assembly 40. Vent 50 may be fluidly coupled to a conduit for conveying fluid away from system 8 and/or directly coupled to the environment and may be composed of composite, metal, plastic, and/or any other appropriate material for conveying a fluid. As illustrated, vent 50 includes a valve 52 to regulate fluid flow from honeycomb assembly 40. Valve 52 may be mechanically, electrically, and/or otherwise controlled. In particular embodiments, valve 52 may be a pop-off valve.

Outlet 60, in turn, allows fluid to be removed from the inside of system 8, which is typically the preferred method for fluid to exit the system. Outlet 60 may have any of a variety of configurations. For example, outlet 60 may include an aperture, a pipe, a conduit, and/or any other appropriate type of mechanism for allowing fluid to flow from the inside of system 8. Outlet 60 may be composed of composite, metal, plastic, and/or any other appropriate type of material for conveying a fluid. As illustrated, outlet 60 includes a valve 62, which regulates the flow of fluid from the inside of system 8.

In operation, a fluid is placed inside of system 8. In particular embodiments, the fluid may be a cryogenic fluid, such as, for example, liquid hydrogen, liquid oxygen, or liquid helium. Outlet 60 may be used to remove the fluid from the inside of system 8. During storage of the fluid in system 8, however, some of the fluid may penetrate second layer 30 and enter honeycomb assembly 40, where it may reside in a liquid and/or gaseous state. If the pressure in honeycomb assembly 40 exceeds or is expected to exceed a predetermined threshold, possibly due to a build-up of fluid in honeycomb assembly 40 and/or heating of structure 10, fluid in honeycomb assembly 40 is removed through the use of vent 50. Valve 52 of vent 50 may be mechanically, electrically, and/or otherwise controlled based on the pressure in honeycomb assembly 40 to regulate the pressure in structure 10. Due to the apertures in the cell walls of honeycomb assembly 40, fluid throughout honeycomb assembly 40 may be removed from structure 10 through vent 50.

This embodiment of the present invention has a variety of technical features. For example, by including apertures in honeycomb assembly 40, fluid that penetrates second layer 30 may be removed from structure 10. Thus, if this fluid begins to and/or might exert detrimental pressure on structure 10, it may be removed, thereby preventing damage to first layer 20, second layer 30, and/or honeycomb assembly 40, which could include separation of honeycomb assembly 40 from first layer 20 and/or second layer 30. As another example, by forming honeycomb assembly 40 of a non-metallic material, structure 10, and possibly containment system 8, has enhanced insulative characteristics. This may allow for the reduction of exterior blanket insulation for cryogenic applications, which could reduce the overall weight of containment system 8. As a further example, by using a laser to form the apertures in the cells of honeycomb assembly 40, the aperture sizes and/or locations may be tightly controlled, and, if needed, the sizes of the apertures may be made relatively small. This allows the impact of the apertures on the integrity of honeycomb assembly 40 to be predicted with reasonable accuracy and to be made relatively small. Moreover, using a laser to form the apertures reduces mechanical touching of honeycomb assembly 40, resulting in less damage to the assembly. Furthermore, using a laser to form the apertures results in relatively little debris in the honeycomb assembly, reducing the risk of the apertures becoming clogged.

Although FIG. 1 illustrates one embodiment of the invention, other embodiments may include less, more, and/or a different arrangement of components. For example, in some embodiments, additional layers may be used. As another example, in certain embodiments, additional vents and/or outlets may be used. Moreover, any number and/or suitable type of inlets may be used. As a further example, vent 50 and outlet 60 may be located at any suitable point of system 8. As an additional example, in some embodiments, first layer 20, second layer 30, and honeycomb assembly 40 may only be part of the housing that contains a fluid. As another example, in certain embodiments, a vacuum pump may be included to forcibly remove fluid from honeycomb assembly 40. Note that by actively evacuating the honeycomb assembly of gases, the risk of damage may be further reduced, and the insulative characteristics of the tank may be improved. As an additional example, in particular embodiments, structure 10 includes a pressure sensor that generates a signal when a predetermined pressure is exceeded in honeycomb assembly 40. This signal is then used to activate valve 52 to allow fluid in honeycomb assembly to flow through vent 50, thereby decreasing the pressure in structure 10. Thus, the pressure in structure 10 may be automatically controlled. A variety of other examples exist.

FIG. 2 illustrates one embodiment of honeycomb assembly 40. In this embodiment, honeycomb assembly 40 has a plurality of hexagonal cells 42. Thus, each of cells 42 has six walls 44, denoted only for cell 42d. As shown, two walls of each cell 42 are thicker because they are part of ribbons, which are used to couple cells 42 together. For example, for cell 42d, walls 44a, and 44d are part of ribbons. Walls that are part of a ribbon are typically adhered to the adjoining wall of the adjacent cell.

As discussed previously, cells 42 contain apertures to allow fluid communication between cells, and eventually to a vent. In the present embodiment, the apertures (not shown) are located in the walls 44 of the cells. In general, apertures may be formed in any of walls 44 in cells 42. In particular embodiments, however, the apertures are formed in the non-ribbon walls 44 of cells 42. For example, cell 42d may have apertures in walls 44b, 44c, 44e, and 44f. Forming the apertures in the non-ribbon walls of the cells typically results in better structural performance for honeycomb assembly 40. As mentioned previously, the apertures may generally be of any size and/or shape.

FIG. 3 illustrates one embodiment of cell 42d for the embodiment of honeycomb assembly 40 in FIG. 2. As mentioned previously, cell 42d includes walls 44. As shown, walls 44a and 44d are thicker than walls 44b, 44c, 44e, and 44f because the former are part of ribbons. In general, walls 44 may have any appropriate width, length, and thickness. If walls 44 are too long, however, a septum may be necessary. Cell 42d also includes apertures 46 in walls 44b, 44c, 44e, and 44f. These apertures allow fluid communication between cells adjacent to cell 42d. Returning to FIG. 2 briefly, it may be observed that apertures 46 will allow fluid communication between cell 42d and cell 42f, cell 42g, cell 42b, and cell 42a. Because each of cells 42 may have similar apertures, fluid communication throughout honeycomb assembly 40 is possible. Of course, as mentioned previously, cells 42 may have any number and/or arrangement of apertures.

Typically, apertures 46 may be located at any depth in cell 42d. In particular embodiments, however, apertures 46 are between approximately one-eighth inch and one-quarter inch inside the face of the cell. Forming apertures away from the face of the cells may allow for better coupling of the honeycomb assembly to the layers. Note that one or more of cell walls 44 may have one or more apertures.

FIG. 4 is a flowchart 400 illustrating a method for manufacturing a pressure regulated structure in accordance with one embodiment of the present invention. The method provides a non-metallic honeycomb assembly having a plurality of cells at function block 404. As mentioned previously, the assembly may be composed of any appropriate material, and the cells may have any appropriate shape. At function block 408, apertures are lasered in at least some of the cell walls to allow fluid communication between cells. As mentioned previously, the apertures may have any of a variety of shapes and may have any of a variety of sizes.

The laser used to form the apertures may be of any suitable type for forming an aperture in a cell wall of a non-metallic honeycomb assembly. Furthermore, the laser may apply any number of pulses to form an aperture in such a cell wall. The number of pulses required generally depends on the power of the laser, the pulse width of the beam, the material of which the honeycomb assembly is composed, and the thickness of the material, although numerous other factors may also affect the operation. For example, in particular embodiments, a Nd:YAG laser operating in the short wave infrared region with a power on the order of 30 W, a pulse rate on the order of 50 Hz, and a pulse width on the order of 10 ns may use on the order of 30 pulses to form an aperture in a cell wall. Optical elements, such as, for example, mirrors, prisms, and/or lenses, may be used to direct the laser beam to the cell wall at the appropriate location and/or angle.

In certain embodiments, the laser may be mounted on a gantry and automatically controlled to raster for creating the apertures. Note that changing the angle of incidence of the laser will change the shape and/or size of the aperture in the cell wall. The focus and/or power of the laser may also be changed to alter the size of the aperture. Additionally, the laser may be used to form an aperture in only one cell wall, two cell walls, establishing a passage between two cells, or any number of walls before being rastered. In particular embodiments, the apertures are generally circular and have diameters between approximately 0.040 inches and 0.003 inches.

At function block 412, the honeycomb assembly is coupled to a first layer. The honeycomb assembly may, for example, be coupled to a first layer by adhering one face of the assembly to the first layer. At function block 416, the honeycomb assembly is coupled to a second layer. Coupling the assembly to a second layer may be accomplished, for example, by adhering the other face of the assembly to the second layer.

A vent is fluidly coupled to the honeycomb assembly at function block 420. The vent may be fluidly coupled to the assembly by being in direct fluid contact with the assembly, by having an intermediate conduit between the assembly and the vent, or by any other appropriate manner.

This embodiment of the invention has a variety of technical features. For example, by using a laser to form the apertures, the size and/or location of the apertures may be tightly controlled. Moreover, the apertures may be made very small, thus having only a minimal impact on the structural strength of the honeycomb assembly. Furthermore, by using a laser to form the apertures, physical contact with the honeycomb assembly is minimized, which helps to reduce damage thereto. As another example, using a non-metallic honeycomb assembly provides the advantages mentioned previously.

Although flowchart 400 illustrates a variety of operations for manufacturing a pressure regulated structure in accordance with one embodiment of the present invention, other embodiments of the invention may include less, more, and/or a different arrangement of operations. For example, in certain embodiments, the vent may not have to be fluidly coupled to the assembly. This could happen, for example, if the vent is already integrated into and/or with the first layer. As another example, in particular embodiments, the assembly may be coupled to the second layer before being coupled to the first layer. Alternatively, the assembly may be coupled to the first layer and the second layer simultaneously. The order of assembly may be dictated by the size, configuration, and/or complexity of the structure being produced. As an additional example, in some embodiments, the honeycomb assembly may be coupled to one of the layers before having apertures lasered in the cell walls of the assembly. As a further example, in particular embodiments, the method may include fluidly coupling a vacuum pump to the honeycomb assembly. This will allow forcible removal of fluid that may reside in the honeycomb assembly. A variety of other examples exist.

FIG. 5 is a flowchart 500 illustrating a method for using a pressure regulated structure in accordance with one embodiment of the present invention. In this embodiment, the structure is part of a fluid containment system. At function block 504, a non-metallic honeycomb assembly between a first layer and a second layer is provided, wherein the assembly has a plurality of cells and at least some of the cell walls contain laser-formed apertures. As mentioned previously, the laser-formed apertures may have any of a variety of shapes and/or sizes. At function block 508, a fluid is placed in the containment system. The fluid may be a liquid and/or gas. In particular embodiments, the fluid comprises a cryogenic liquid.

At function block 512, whether the pressure in the structure exceeds a threshold is determined. This determination may be made by appropriate mechanical and/or electrical devices. If the pressure does not exceed the threshold, the method calls for continuing to monitor whether the pressure exceeds the threshold. If, however, the pressure does exceed the threshold, fluid in the honeycomb assembly is removed at function block 516. Removing fluid in the honeycomb assembly may include opening a valve and/or vacuum pumping the honeycomb assembly. During and/or after fluid removal, the method calls for again determining whether the pressure exceeds the threshold. If the pressure again exceeds the threshold, more fluid is removed.

Although flowchart 500 illustrates a variety of operations for using a pressure regulated structure in accordance with one embodiment of the present invention, other embodiments of the present invention may include less, more, and/or a different arrangement of operations. For example, in certain embodiments, the method calls for determining the amount of fluid to be removed from the honeycomb assembly if the pressure exceeds a threshold. Thus, a given amount of fluid may be removed from the honeycomb assembly, or fluid may be removed for a certain period of time. As another example, in particular embodiments, the method calls for removing fluid from the interior of a fluid containment system of which the structure is a part, which may or may not have an effect on the pressure in the structure since the flaws/defects that permit seepage often act as one way valves. As mentioned previously, this may be accomplished by, for example, an outlet, such as, for example, outlet 60. This function may be accomplished at predetermined times and/or upon receipt of appropriate commands. As a further example, in particular embodiments, the method may not include the operation in function block 508, possibly because the structure is not part of a fluid containment system. As an additional example, in certain embodiments, fluid may be removed from the honeycomb assembly based on factors other than pressure, such as, for example, time and/or temperature. A variety of other examples exist.

Although the present invention has been discussed primarily with respect to the fluid in a fluid containment system penetrating the structure and being removed through the honeycomb assembly, the present invention may be useful in a variety of other contexts. For example, the invention may be used to remove any fluid in a containment system that penetrates the structure. As another example, the invention may be used to remove fluid that penetrates the structure from the outside, such as, for example, moisture ingression. As a further example, the structure may be useful in a variety of systems other than fluid containment systems. For instance, in systems that experience moisture ingression and large thermal transients, such as, for example, missile fairings and jet exhaust impinged structures on aircraft, the invention may allow for the prevention of disbonding of the honeycomb assembly from the layers. The material and/or configuration of the layers and/or honeycomb assembly of the structure may, of course, be modified appropriately for these embodiments. A variety of other example exist.

While a variety of embodiments have been discussed for the present invention, a variety of additions, deletions, modifications, and/or substitutions will be readily suggested to those skilled in the art. It is intended, therefore, that the following claims encompass such additions, deletions, modifications, and/or substitutions.

What is claimed is:

1. A pressure regulated structure, comprising:
   a first layer;
   a second layer;
   a non-metallic honeycomb assembly between the first layer and the second layer, the honeycomb assembly comprising a plurality of walls forming cells, at least some of the walls including laser-formed apertures to allow fluid communication between cells;
   a vent fluidly coupled to the honeycomb assembly;
   a pressure measurement device operable to measure a pressure within the structure; and
   wherein fluid in the cells of the honeycomb assembly may be removed through the vent to decrease pressure in the structure in response to a determination that the pressure measured by the pressure measurement device exceeds a particular threshold.

2. The structure of claim 1, wherein the first layer comprises a composite material.

3. A pressure regulated structure, comprising:
   a first layer;
   a second layer;
   a non-metallic honeycomb assembly between the first layer and the second layer, the honeycomb assembly comprising a plurality of walls forming cells, at least some of the walls including laser-formed apertures to allow fluid communication between cells;
   a vent fluidly coupled to the honeycomb assembly;
   wherein fluid in the cells of the honeycomb assembly may be removed through the vent to decrease pressure in the structure; and
   wherein the honeycomb assembly comprises phenolic bonded, high modulus aramid webs.

4. The structure of claim 1, wherein the k apertures are between approximately 0.100 inches and 0.001 inches in diameter.

5. The structure of claim 1, wherein the apertures are at least 0.125 inches from the face of the honeycomb assembly.

6. The structure of claim 1, wherein the structure is part of a fluid containment system.

7. The structure of claim 1, wherein the structure contains, at least in part, a cryogenic liquid.

8. The structure of claim 1, further comprising a vacuum pump to forcibly remove fluid in the cells.

9. A method for manufacturing a pressure regulated structure, comprising:
   lasering apertures in at least some of the cell walls of a non-metallic honeycomb assembly to allow fluid communication between cells;
   coupling the assembly to a first layer;
   coupling the assembly to a second layer;
   operatively coupling a pressure measurement device to the structure, the pressure measurement device operable to measure a pressure within the structure; and
   wherein fluid in the cells of the honeycomb assembly may flow between cells to be removed from the structure in response to a determination that the pressure measured by the pressure measurement device exceeds a particular threshold.

10. The method of claim 9, wherein the apertures are between approximately 0.100 inches and 0.001 inches in diameter.

11. The method of claim 9, wherein the apertures are at least 0.125 inches from the face of the honeycomb assembly.

12. The method of claim 9, further comprising fluidly coupling a vent to the honeycomb assembly.

13. The method of claim 9, further comprising fluidly coupling a vacuum pump to the honeycomb assembly.

14. A method for using a pressure regulated structure, comprising:
   providing a structure comprising a non-metallic honeycomb assembly between a first layer and a second layer, the honeycomb assembly including a plurality of walls forming cells, at least some of the walls containing laser-formed apertures to allow fluid communication between cells;

measuring a pressure in the structure; and removing fluid in the honeycomb assembly when the measured pressure exceeds a predetermined level.

15. The method of claim 14, wherein the apertures are between approximately 0.100 inches and 0.001 inches in diameter.

16. The method of claim 14, wherein removing fluid in the honeycomb assembly comprises opening a valve to allow the fluid to flow through a vent fluidly coupled to the honeycomb assembly.

17. The method of claim 14, wherein removing the fluid in the honeycomb assembly comprises vacuum pumping the honeycomb assembly.

18. A pressure regulated structure, comprising:

a first composite layer;

a second composite layer;

a non-metallic honeycomb assembly between the first layer and the second layer, the honeycomb assembly comprising a plurality of walls forming cells, each non-ribbon cell wall including a laser-formed aperture between approximately 0.040 inches and 0.020 inches in diameter and at least 0.125 inches from the face of the honeycomb assembly to allow cryogenic fluid communication between cells; and a vent fluidly coupled to the honeycomb assembly;

wherein cryogenic fluid in the cells of the honeycomb assembly may be removed through the vent to decrease pressure in the structure; and wherein the honeycomb assembly comprises phenolic, bonded high modulus aramid webs.

19. The structure of claim 3, wherein the first layer comprises a composite material.

20. The structure of claim 3, wherein the apertures are between approximately 0.100 inches and 0.001 inches in diameter.

21. The structure of claim 3, wherein the apertures are at least 0.125 inches from the face of the honeycomb assembly.

22. The structure of claim 3, wherein the structure is part of a fluid containment system.

23. The structure of claim 3, wherein the structure contains, at least in part, a cryogenic liquid.

24. The structure of claim 3, further comprising a vacuum pump to forcibly remove fluid in the cells.

* * * * *